July 6, 1926.  
E. W. DAVIS  
LUBRICATING SYSTEM  
Filed July 16, 1925
1,591,158
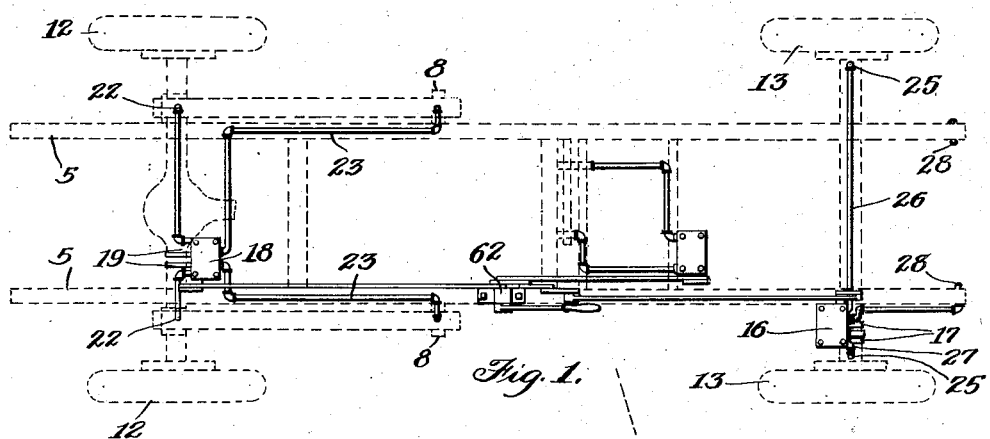
Fig. 1.
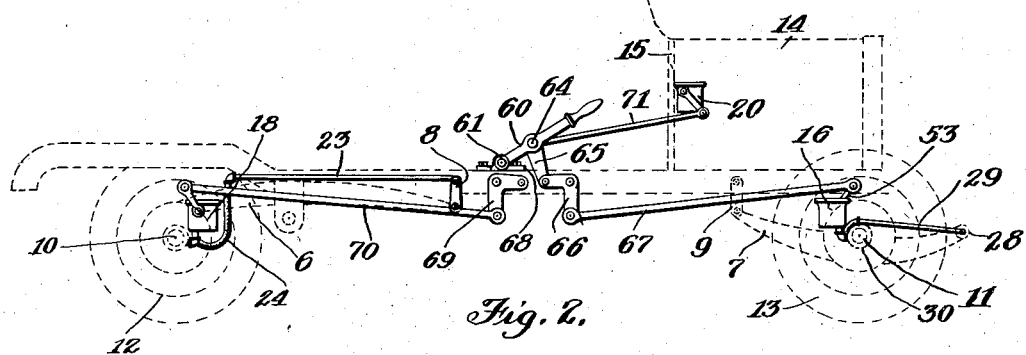
Fig. 2.
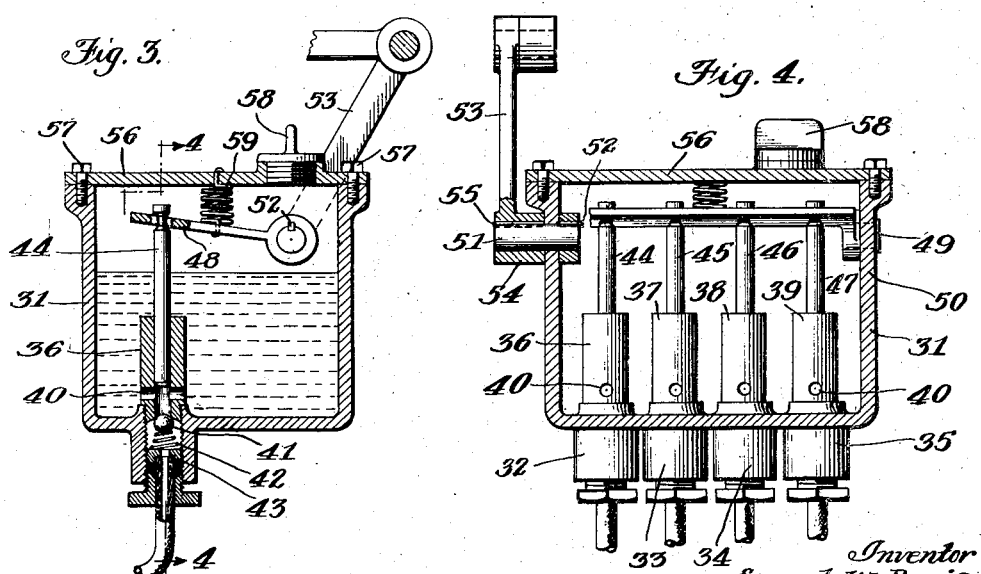
Fig. 3.
Fig. 4.
Inventor
Ernest W. Davis
By Pierce and Sweet
Attys.

Patented July 6, 1926.

1,591,158

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed July 16, 1925. Serial No. 43,987.

My invention relates to improvements in lubricating systems, and is particularly concerned with the provision of a novel type of lubricating system to be used for lubricating the chassis bearings of automobiles and other automotive vehicles.

At the present time, several different systems of lubricating the chassis bearings of automotive vehicles are in use, among which are the so-called centralized lubricating systems. In some of these centralized lubricating systems a single pump supplies lubricant to all of the chassis bearings through numerous conduits, the conduits terminating in means for determining the amount of lubricant fed to each bearing upon each operation of the pump. In other systems the pump itself includes means for determining the quantity of lubricant discharged through each conduit upon each operation of the pump, and in still other systems, restrictions of various kinds are placed in the conduit leading from the pump in an attempt properly to distribute the lubricant to the various bearings.

Each of the above systems has certain objectionable features. Either the multiplicity of pipes leading to the bearings is objectionable, on account of the length of these conduits and the difficulty and expense of installing them and keeping them in condition, or, in case of branched conduits and means, either in the conduits themselves or adjacent the bearings, for proportioning the lubricant fed to the various bearings, these means have been found more or less unreliable.

The objects of my present invention are:

First, to provide a system in which the objections to the known systems are eliminated by making use of means that will accurately determine the quantity of oil or lubricant fed to each bearing, in combination with comparatively short conduits for reaching the various bearings. The resistance of the conduits themselves as a material factor in the distribution of the lubricant, particularly in cold weather when low temperatures increase the viscosity of the oil, and depends on the length, diameter and configuration of the conduit. By making use of short conduits many bends and joints found necessary in longer conduits are also eliminated. This permits use of smaller and cheaper conduits.

Second, to provide a lubricating system comprising means for positively forcing lubricant into each bearing.

Third, to provide a lubricating system in which, in order to realize the benefits outlined above, a plurality of pumps are employed, these pumps being positioned more or less centrally of the various groups of bearings found on a chassis, and common means for actuating the several pumps.

Fourth, to provide a system, such as described, in which the several pumps are connected by means of levers and links so as to make it possible to operate them by means of a single operating member.

Fifth, to provide a system, of the character described, in which the operating mechanism is carried by the frame of the chassis, but one or more of the pumps are carried by the axles, connections between the operating mechanism and the pumps being such as to compensate for relative movement between the axles and the frame of the chassis.

And, sixth, to provide a system, such as described, that is simple in construction, economical to manufacture and positive in its operation.

Other objects of this invention will appear as this description progresses, reference being had to the accompanying drawings, in which:—

Figure 1 is a plan view of a chassis equipped with a lubricating system embodying one form of my invention, the chassis being shown in dotted outline;

Figure 2 is a side elevation of the construction shown in Figure 1;

Figure 3 is a vertical, transverse section through one form of pump suitable for use in my improved system; and Figure 4 is a longitudinal section through Figure 3, this section being taken on line 4—4 of Figure 3.

In the embodiment of my invention disclosed herein I have illustrated in dotted outline a conventional form of automobile chassis, comprising the side frame members 5 and the front and rear springs 6 and 7, these springs being connected with the side members through shackles 8 and 9, respectively. The springs 6 and 7 are supported by the front axle 10 and rear axle 11, respectively, that are in turn supported by the wheels 12 and 13. In Figure 2 the hood 14 is shown in dotted outline and the partition 15, between the hood and the body of the vehicle, is illustrated because it forms a support for one of the pump units about to be described.

The chassis construction just described is, as stated above, purely conventional and forms no part of my present invention except in combination with the elements hereafter referred to.

A pump unit 16 is secured to the front axle in any suitable manner, as, for instance, by means of the strips 17, and a similar pump unit 18 is mounted upon the rear axle housing by means of similar strips 19. In Figure 1 these pump units are illustrated as lying upon opposite sides of one of the chassis side frame members, but it is, of course, to be understood that these pump units can be secured to the axles at any suitable points. A similar pump unit 20 may be screwed, bolted, or otherwise secured to the partition 15. The first two pump units, namely, 16 and 18, are intended to supply lubricant to the bearings carried by, or forming a part of, the front and rear axles, respectively, such, for instance, as the king pins 21 and the rear spring bearing 22. Oil may be conducted to the front shackles 8 of the rear springs 6 from the rear pump unit 18 by means of more or less rigid conduits 23, connected with the rear pump unit by means of flexible conduits 24 (only one of which is shown). The front pump unit 16 may be connected with the king pins 25 by means of conduits 26 and 27, and connected with the front shackle bolts 28 by means of a conduit comprising the rigid section 29 and the flexible section 30.

The particular means shown and described for connecting the pump units with the various bearings are merely illustrative and may be modified or varied to suit the varying conditions incident to different chassis constructions.

Each pump unit comprises a supply tank 31 for holding a supply of lubricant. A plurality of hollow bosses 32, 33, 34 and 35 are formed integrally with the bottom of the supply tank and into the upper open ends of each of these bosses are screwed the cylinders 36, 37, 38 and 39, respectively. These cylinders have inlet openings 40, positioned above the upper ends of the bosses, and a check valve 41 is yieldingly held against the discharge end of the cylinder by means of a spring 42 confined between the check valve and a collet 43. One of the conduits described above is connected with each of the bosses 32, 33, 34 and 35 for the purpose of conveying lubricant to one or more of the chassis bearings.

Plungers 44, 45, 46 and 47 are reciprocably mounted in the cylinders 36, 37, 38 and 39, respectively, and the upper ends of these plungers extend through suitable openings in the plate 48. The short shaft 49 is journaled in one end of the tank 31 and pressed into a boss 50 on the adjacent end of the plate 48, and a similar shaft 51 is journaled in the opposite end of the tank, keyed to the other end of the plate by means of the key 52. A crank 53 has a hollow boss 54 that receives the outer end of the shaft 51 and is keyed to the shaft 51 by means of the key 55.

A cover plate 56 is secured to the tank by means of screws 57, or in any other desirable manner. This cover plate may be provided with a filling opening closed by the cap 58. For returning the plate 48 to the position shown in Figure 3, I prefer to provide the tension spring 59, one end of which is secured to the cover plate and the other end of which is secured to the plate 48.

For operating the pumps 16, 18 and 20 I prefer to mount a lever 60 at some point on the chassis where it will be convenient for the operator to manipulate it. In this case it is shown as being secured to a shaft 61, journaled in a bearing block 62 that is secured to one of the frame members. The lever 60 has a handle 63 at its outer end and a pivot 64 intermediate its ends. This pivot is connected with the pump 16 by means of the link 65, the bell crank lever 66 and the link 67, the front end of which is pivotally connected with the crank 53 of the pump 16. In a similar manner the lever 60 is connected with the pump 18 by means of the link 68, bell crank lever 69 and link 70, while the pump 20 is connected with the lever 60 by means of the link 71.

In the operation of my improved system, the tank 31 is partially filled with oil which, when the plungers are in the position shown in Figure 3, flows into the lower portions of the bores of the cylinders through the inlet openings 40. When the operator grasps the handle 63 and pulls it toward the rear, the plungers in all of the cylinders in all the pumps are forced downwardly past the inlet openings, thereby sealing the cylinders from the tank 31, and further movement of the handle causes the plungers to eject a small charge of lubricant from each cylinder into its corresponding conduit and this lubricant is either forced or flows into the bearing to which the conduit is connected. When the operator releases his hold upon the handle 63, the springs 59 will return the plungers and the operating mechanism to their initial position. By repeating the process, as much lubricant as may be desired can be forced into the various bearings. It will, of course, be understood that by varying the lengths of the plungers, or the diameters of the plungers and the cylinders, or in other known ways, the quantities of oil discharged by the various plungers can be proportioned to the requirements of the various bearings.

It should be noted that the connection between the operating lever 60 and the pumps 16 and 18 is such that free movement of the front and rear axles, relatively to the chassis frame, is permitted, and that these pumps can be operated irrespective of the distance separating the axles from the frame. Movement of the axles relatively to the frame will result in more or less movement of the plungers, but from an inspection of Figure 3 it will be seen that before these plungers begin to discharge lubricant from the cylinders, they must travel through a certain distance and that they are ineffective to discharge lubricant from the cylinders until they have passed through this distance. This distance is such that the normal variations in spacing between the axles and the frame will not interfere with the operation of the various pumps. In other words, the connections between the operating lever and the various pumps are such that they compensate for variations in the distances between the axles and the frame. A slight amount of play in the various pivot joints will compensate for lateral displacement of the axles relatively to the frame.

From the above description it will be apparent that I have provided a novel type of positive acting lubricating system comprising simple means for properly proportioning the lubricant to the various bearings of an automotive vehicle chassis.

While I have described the details of construction of one embodiment of my invention, it is to be clearly understood that my invention is not limited to these details but is capable of other adaptations and modifications within the scope of the appended claims.

Having thus described my invention, what I claim is:—

1. The combination with an automotive vehicle chassis comprising front and rear axles and a frame mounted on and movable relatively to said axles, of means for lubricating some of the bearings on said axles and frame, comprising a supply tank and pump mounted on each axle and on said frame and respectively connected with the bearings on each axle and frame, and common means for actuating all of said pumps, comprising a single lever and a linkage connection between said lever and each of said pumps, the linkage connection between said lever and the pumps on said axles including means for automatically compensating for differences in the relative positions of said axles and frame without actuating said pump.

2. The combination with an automotive vehicle chassis comprising front and rear axles and a frame mounted on and movable relatively to said axles, of means for lubricating some of the bearings on said axles and frame, comprising a supply tank and pump mounted on each axle and on said frame and respectively connected with the bearings on each axle and frame, and common means for actuating all of said pumps, comprising a series of rigid members connected by means of pivots having horizontal axes, said members being disposed to compensate for relative movements between said axles and frame.

3. The combination with an automotive vehicle chassis comprising front and rear axles and a frame mounted on and movable relatively to said axles, of means for lubricating some of the bearings on said axles and frame, comprising a supply tank and pump mounted on each axle and on said frame and respectively connected with the bearings on each axle and frame, and common means for actuating all of said pumps, comprising a series of rigid members pivotally connected to compensate for relative movements between said axles and frame.

4. The combination with an automotive vehicle chassis comprising an axle and a frame supported thereon and movable relatively thereto, of means for lubricating bearings on said axle, comprising a pump supported by said axle, conduits for connecting said pump with said bearings, and means for actuating said pump comprising an operative device mounted on said frame and a series of linkages between said operating device and said pump, including means for compensating for relative movements between said frame and axle.

5. The combination with an automotive vehicle chassis comprising an axle and a frame supported thereon and movable relatively thereto, of means for lubricating bearings on said axle, comprising a pump supported by said axle, conduits for connecting said pump with said bearings, and means for actuating said pump comprising movable means mounted on said frame and mechanical means connecting said movable means with said pump, said mechanical means including means for compensating for relative movements between said frame and axle.

6. The combination with an automotive vehicle chassis comprising front and rear axles and a frame mounted on and movable relatively to said axles, of means for lubricating some of the bearings on said axles and frame, comprising a supply tank and pump mounted on each axle and on said frame and respectively connected with the bearings on said axle and frame, and common means for actuating all of said pumps comprising an actuating device on said frame, and mechanical linkage connections between said device and each of said pumps, the connections to the pumps on the axles including compensating means for permitting relative movement between said axles and said frame.

7. The combination with an automotive vehicle chassis comprising front and rear axles and a frame mounted on and movable relatively to said axles, of means for lubricating some of the bearings on said axles and frame, comprising a pump mounted on each axle and on said frame and respectively connected with the bearings on said axle and frame, and common means for actuating all of said pumps comprising an actuating device on said frame, and mechanical linkage connections between said device and each of said pumps, the connections to the pumps on the axles including compensating means for permitting relative movement between said axles and said frame.

8. The combination with an automotive vehicle chassis comprising front and rear axles and a frame mounted on and movable relatively to said axles, of means for lubricating some of the bearings on said axles and frame, comprising three pumps, one on each axle and one on said frame, and common mechanical means for actuating all said pumps in a single operation, said mechanical means including means for compensating for transverse and longitudinal movement of said frame relative to said axle.

In witness whereof, I hereunto subscribe my name this 11th day of July, 1925.

ERNEST W. DAVIS.